J. ADAMS.
HORSE-BLANKET.
No. 185,201.             Patented Dec. 12, 1876.
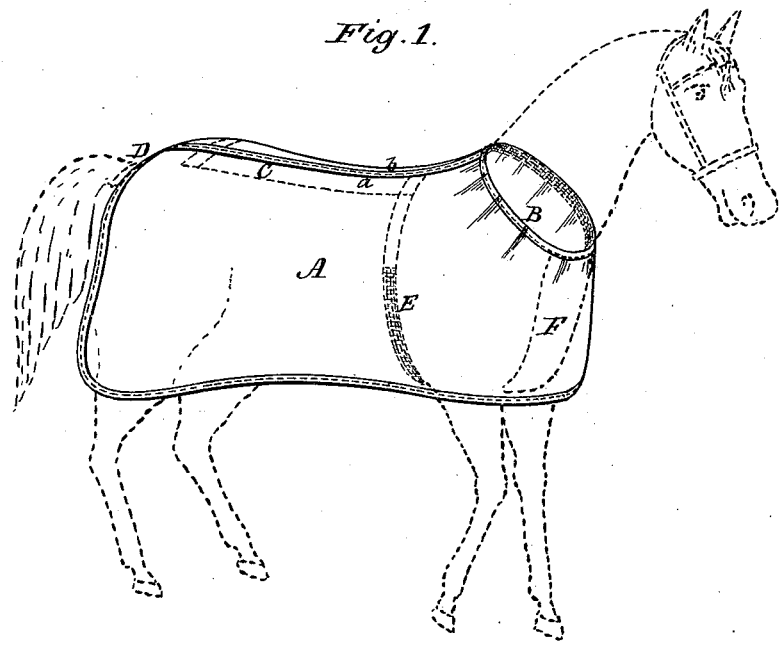
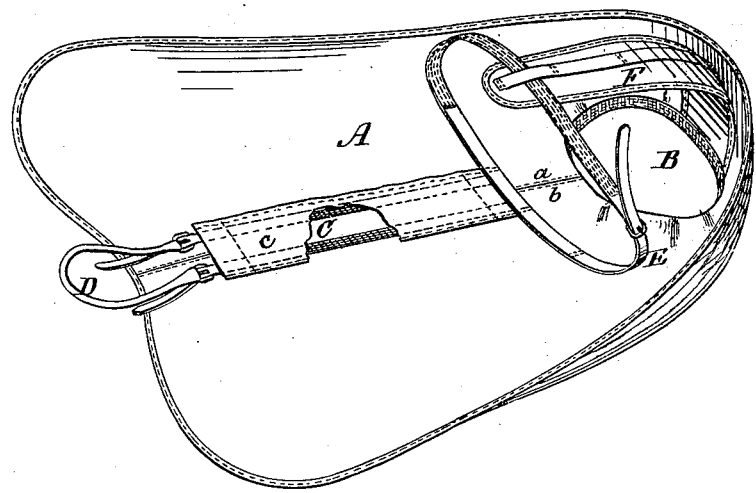

UNITED STATES PATENT OFFICE.

JOSEPH ADAMS, OF QUINCY, MASSACHUSETTS, ASSIGNOR TO FRANK B. ADAMS, OF SAME PLACE.

IMPROVEMENT IN HORSE-BLANKETS.

Specification forming part of Letters Patent No. 185,201, dated December 12, 1876; application filed September 7, 1876.

*To all whom it may concern:*

Be it known that I, JOSEPH ADAMS, of Quincy, in the county of Norfolk and State of Massachusetts, have invented certain Improvements in Animals' Blankets, of which the following is a specification:

My improvements consist, first, in the addition to, or combination with, a horse-blanket of a breast pad or protector; second, in the employment of one or more elastic straps as a means of confining the greater portion of the blanket in place, and adapting the same blanket to animals of different size; thirdly, in the peculiar construction of the blanket, as hereinafter stated, whereby greater protection is afforded the animal, the blanket cannot be pulled off, and buttons or straps for securing the blanket in front are rendered unnecessary; and, fourthly, in fulling the neck-hole of the blanket, and employing, in connection with such fullness, an elastic medium, whereby this portion of the blanket is adapted to animals whose necks vary in size.

The drawings accompanying this specification represent, in Figure 1, an outside view of the blanket, and in Fig. 2 an inside view of the same, in perspective.

In the said drawings, A represents a horse-blanket, substantially of ordinary production, with the exception of the front portion, which is made whole, the neck-hole of the blanket being shown at B.

In the manufacture of a blanket according to my invention, I employ a piece of suitable stuff, of a uniform width as woven, and I double it in the middle, and allow the central portion to constitute the front of the blanket to cover the animal's chest. I then cut away sufficient of the material to form the neck-hole B, and stitch the two edges of the sides *a b* of the body of the blanket together, and allow the seam to cover the center of the animal's back. I full or gather the front portion of the blanket about the neck-hole B, and add an elastic strap, by means of which the hole becomes expansible, and the blanket is adapted to varying sizes of animals.

To confine the main portion of the blanket to the back of the animal, I employ an elastic strap, C, placed centrally of the under side of the blanket, and secured at one end to the front portion of the latter, while, at its rear end, the elastic strap is secured to a crupper or crupper-strap, D, of any suitable character.

The elastic strap C passes through several loops attached to the under side of the blanket, or, as shown in the drawing, between the under side of the blanket and a stay-piece or re-enforce, *c*, secured to the blanket in a proper manner, which serve to confine the two together; and this strap may be in one piece, or two or more, as circumstances may determine, its office being to enable the blanket to yield to the various pulls upon it during the movements of the animal without being pulled off or torn.

A strap, E, which may be elastic, if desired, is secured to the under side of the front of the blanket, immediately in rear of the animal's fore legs, and when the blanket is in use, this strap is buckled beneath the animal's belly.

F in the drawings represents an auxiliary pad secured to the inside of the front of the blanket, and hanging down in front of the animal's chest, a loop being secured to the lower end of the pad, through which the strap E passes, and by which the pad is held in place.

The pad F protects the chest of the animal, and will be found a valuable auxiliary of a blanket. It also aids in holding the blanket in place under all circumstances, and it will be found impossible for the animal to pull the blanket entirely off.

The employment of the elastic medium and the construction of the front of the blanket (being whole) avoid the use of buttons or straps to confine the blanket about the animal's neck, and render the tearing of the blanket nearly impossible.

If deemed advisable, the pad F may be fulled and provided with an elastic band, in order to fit animals of various sizes, and prevent tearing of the material.

I claim—

1. As an improved article of manufacture, a horse-blanket made whole in front, and provided with the elastic strap C, substantially as described.

2. The auxiliary breast-protector F, in combination with the blanket proper, substantially as and for purposes stated.

JOSEPH ADAMS.

Witnesses:
WM. ALDER,
F. CURTIS.